(12) United States Patent
Yamada et al.

(10) Patent No.: US 8,935,067 B2
(45) Date of Patent: Jan. 13, 2015

(54) SHIFT-BY-WIRE SYSTEM FOR AUTOMATIC TRANSMISSION OF VEHICLE

(71) Applicant: Denso Corporation, Kariya, Aichi-pref. (JP)

(72) Inventors: Jun Yamada, Nagoya (JP); Kiyoshi Kimura, Kariya (JP)

(73) Assignee: Denso Corporation, Kariya (JP)

( * ) Notice: Subject to any disclaimer, the term of this patent is extended or adjusted under 35 U.S.C. 154(b) by 148 days.

(21) Appl. No.: 13/655,779

(22) Filed: Oct. 19, 2012

(65) Prior Publication Data

US 2013/0110364 A1 May 2, 2013

(30) Foreign Application Priority Data

Oct. 28, 2011 (JP) ................................. 2011-237110

(51) Int. Cl.
*F16H 61/68* (2006.01)
*F16H 59/10* (2006.01)

(52) U.S. Cl.
CPC .............. *F16H 61/68* (2013.01); *F16H 59/105* (2013.01); *F16H 2300/18* (2013.01)
USPC ..................... 701/61; 701/51; 701/62; 701/95

(58) Field of Classification Search
CPC .... B60W 10/11; F16H 39/34; F16H 61/0213; F16H 61/061; F16H 59/44; F16H 61/28; F16H 61/68; F16H 63/3458
USPC .......................................... 701/51, 61–62, 95
See application file for complete search history.

(56) References Cited

U.S. PATENT DOCUMENTS

| 8,401,747 B2* | 3/2013 | Ito ................................... 701/51 |
| 2001/0049573 A1* | 12/2001 | Ohashi et al. ................... 701/51 |
| 2008/0016978 A1* | 1/2008 | Nagano et al. ............. 74/473.18 |
| 2008/0168853 A1* | 7/2008 | Amamiya et al. ............... 74/335 |
| 2008/0182717 A1* | 7/2008 | Shinojima et al. ............ 477/115 |
| 2008/0215215 A1* | 9/2008 | Kashiwagi ....................... 701/51 |
| 2009/0287383 A1* | 11/2009 | Fujii et al. ........................ 701/51 |
| 2009/0292431 A1* | 11/2009 | Hoshino et al. ................. 701/62 |
| 2010/0250055 A1* | 9/2010 | Ito et al. .......................... 701/34 |

FOREIGN PATENT DOCUMENTS

| JP | 2007-271036 A | 10/2007 |
| JP | 2008-180281 A | 8/2008 |
| JP | 2009162309 | 7/2009 |
| JP | 2009-245007 A | 10/2009 |

OTHER PUBLICATIONS

U.S. Appl. No. 13/655,693, Kimura et al.
Office Action issued Oct. 15, 2013 in corresponding JP Application No. 2011-237110 (with English translation).

* cited by examiner

*Primary Examiner* — Mary Cheung
*Assistant Examiner* — Atul Trivedi

(57) ABSTRACT

An electronic control unit senses an actual shift range of a automatic transmission by executing a range determination operation, which determines the actual shift range of the automatic transmission based on a rotational position of a manual shaft that is sensed with an encoder. The control unit prohibits the execution of the range determination operation throughout a range determination operation prohibiting period, which is a predetermined time period and starts from a time point of starting rotation of the rotor of the electric motor unit toward the target rotational position.

8 Claims, 8 Drawing Sheets

US 8,935,067 B2

SHIFT-BY-WIRE SYSTEM FOR AUTOMATIC TRANSMISSION OF VEHICLE

CROSS REFERENCE TO RELATED APPLICATION

This application is based on and incorporates herein by reference Japanese Patent Application No. 2011-237110 filed on Oct. 28, 2011.

TECHNICAL FIELD

The present disclosure relates to a shift-by-wire system for an automatic transmission of a vehicle.

BACKGROUND

In the field of the vehicle control technology, there is often used a by-wire system. The by-wire system electrically controls an actuator, which changes an operational state of a vehicle, through a by-wire control circuit in response to a command of a driver (user) of the vehicle. For example, a shift-by-wire system, which shifts a shift range of an automatic transmission of the vehicle in response to a command of the driver of the vehicle, is known. In the shift-by-wire system, the shift range is shifted by, for example, rotating an electric actuator to drive a range shift mechanism of the automatic transmission. The range shift mechanism includes a detent plate, a manual valve and a detent spring. The detent plate is rotated by an actuator. The manual valve is operable synchronously with the detent plate. The manual valve sets a shift range of the automatic transmission to a corresponding range, which corresponds to the rotational position of the detent plate. The detent spring includes a limiting portion, which is adapted to be fitted into a corresponding one of recesses formed in the detent plate to limit the rotation of the detent plate and thereby to fix the shift range of the automatic transmission to the corresponding predetermined range. The actuator includes an electric motor unit and a speed reducing unit. The motor unit is rotatable at a high speed. The speed reducing unit reduces the rotational speed of the motor unit and outputs the rotation of the reduced rotational speed. In a case where a brushless motor, such as a switched reluctance (SR) motor, is used in the motor unit, an incremental encoder (also referred to as an increment type encoder) is typically provided in the actuator. The incremental encoder outputs a pulse signal, which corresponds to an amount of change in the rotational angle of the electric motor unit. A rotational state of the motor unit is sensed based on the pulse signal outputted from the encoder, and the sensed state of the motor unit is used in a feedback control operation of the motor unit. In this way, the rotation of the motor unit can be appropriately controlled.

JP2009-162309A discloses a shift-by-wire system, which includes an output angle sensing means that senses a rotational angle of an output shaft of an actuator. An actual range of an automatic transmission is determined based on a signal outputted from the output angle sensing means, which indicates the rotational angle of the output shaft of the actuator. In this shift-by-wire system, a range determination extent in the middle of rotating the motor unit, i.e., in the middle of shifting the shift range of the automatic transmission is set to be larger than a range determination extent in a stop state of the motor unit. However, in the shift-by-wire system of JP2009-162309A, the actual range is determined even during the period of rotating the motor unit. Therefore, an erroneous determination of the actual range may possibly occur due to sensing variations.

SUMMARY

The present disclosure is made in view of the above disadvantage.

According to the present disclosure, there is provided a shift-by-wire system for an automatic transmission of a vehicle. The shift-by-wire system includes an electric motor unit, a manual shaft, a detent plate, a detent spring, a rotational position sensing device and a controller. The electric motor unit includes a rotor. The rotor is rotated when the electric motor unit is energized. The manual shaft is rotated by a drive force outputted from the electric motor unit upon rotation of the rotor. The detent plate includes a plurality of recesses and is fixed to the manual shaft to rotate integrally with manual shaft. The detent spring includes a limiting portion. When the limiting portion is urged in a recessing direction of one of the plurality of recesses of the detent plate and is fitted into the one of the plurality of recesses of the detent plate, the rotation of the detent plate is limited to hold a shift range of the automatic transmission. The rotational position sensing device directly or indirectly senses a rotational position of the manual shaft. The controller senses an actual range of the automatic transmission by executing a range determination operation, which determines the actual range of the automatic transmission based on the rotational position of the manual shaft that is sensed with the rotational position sensing device. The controller prohibits the execution of the range determination operation throughout a range determination operation prohibiting period, which is a predetermined time period and starts from a time point of starting rotation of the rotor of the electric motor unit toward the target rotational position.

BRIEF DESCRIPTION OF THE DRAWINGS

The drawings described herein are for illustration purposes only and are not intended to limit the scope of the present disclosure in any way.

DETAILED DESCRIPTION

Figure 1:
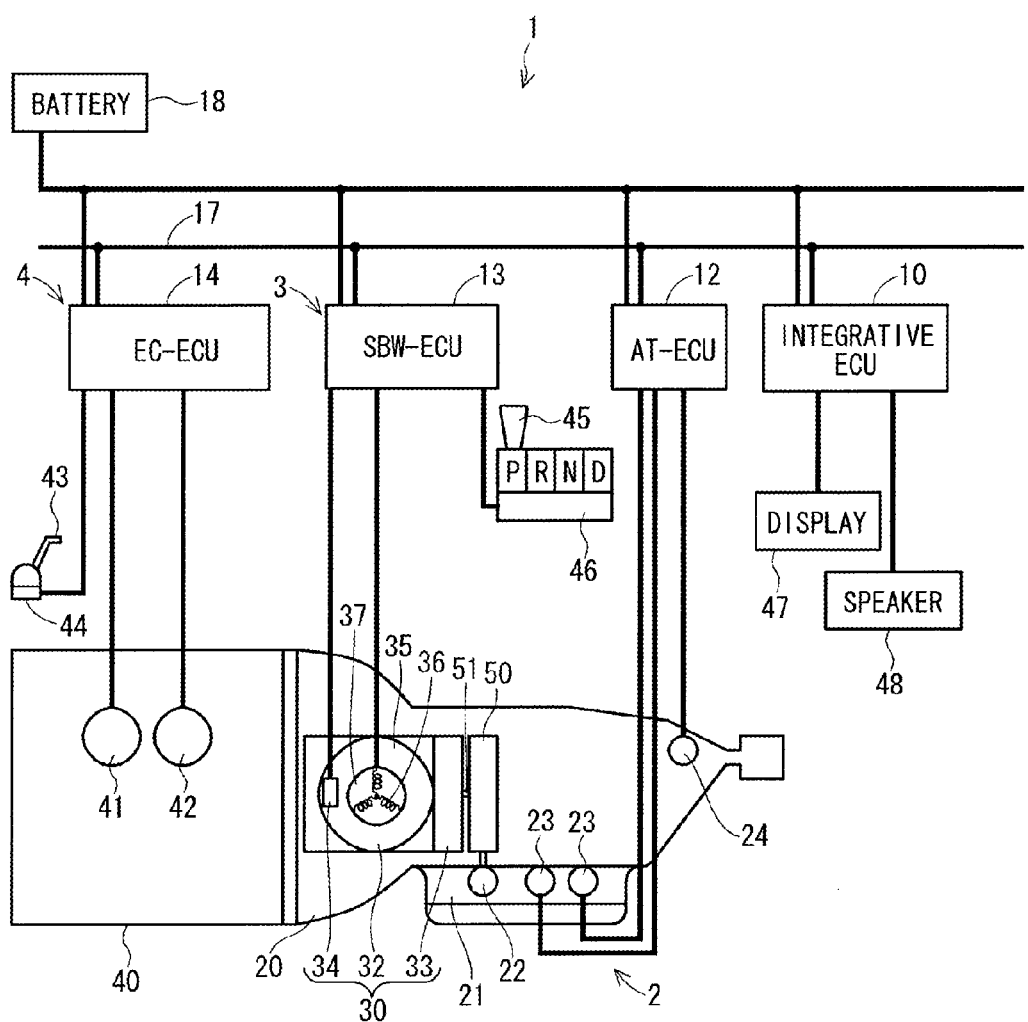
FIG. 1 is a schematic diagram showing a vehicle control system, which includes a shift-by-wire system according to a first embodiment of the present disclosure.

Shift-by-wire systems of various embodiments of the present disclosure will be described with reference to the accompanying drawings. In the following embodiments, similar components will be indicated by the same reference numerals and will not be described redundantly for the sake of simplicity. In the following description, an electronic control unit will be abbreviated as "ECU."

First Embodiment

FIG. 1 shows a vehicle control system 1 of a first embodiment, which is installed in, for example, a four-wheel vehicle (also referred to as a four-wheel automobile). The vehicle control system 1 includes an automatic transmission (AT) control system 2, a shift-by-wire (SBW) system 3, an engine control (EC) system 4 and an integrative ECU 10.

The automatic transmission (AT) control system 2, the shift-by-wire (SBW) system 3 and the engine control (EC) system 4 include an AT-ECU 12, an SBW-ECU 13 and an EC-ECU 14, respectively. Each of the AT-ECU 12, the SBW-ECU 13 and the EC-ECU 14 is constructed as a small computer that includes a central processing unit (CPU), a read-only memory (ROM), a random-access memory (RAM) and an input/output device. The CPU may possibly serve as a computing means. The ROM and the RAM may possibly serve as storage devices or a storage means. The input/output device may possibly serve as an input/output means. The AT-ECU 12, the SBW-ECU 13 and the EC-ECU 14 are electrically or optically interconnected with each other through a local-area network (LAN) line 17 installed in the vehicle. The AT-ECU 12, the SBW-ECU 13, the EC-ECU 14 and the integrative ECU 10 are electrically connected to a battery 18 (an electric power source of the vehicle) and are driven by the electric power supplied from the battery 18. The integrative ECU 10 controls the entire vehicle control system 1 in cooperation with the AT-ECU 12, the SBW-ECU 13 and the EC-ECU 14.

The automatic transmission control system 2 drives the automatic transmission 20 of the vehicle with the hydraulic pressure (oil pressure). The automatic transmission control system 2 includes a hydraulic circuit 21, which shifts a shift range and a gear position of the automatic transmission 20. In this particular embodiment, the automatic transmission 20 is operable in one of a drive range (D-range), a reverse range (R-range), a parking range (P-range) and a neutral range (N-range). The D-range is a forward drive range for driving the vehicle forward. The R-range is a reverse drive range for driving the vehicle backward. The P-range is a non-drive range and is used for parking the vehicle. The N-range is a non-driving range and is used for placing the automatic transmission in a neutral position. The hydraulic circuit 21 includes a manual valve 22, which is configured into a rod form. The manual valve 22 is axially movable to change an operational state of the hydraulic circuit 21. When the manual valve 22 is driven to change the operational state of the hydraulic circuit 21, the automatic transmission 20 is set to the corresponding shift range. The automatic transmission 20 includes a plurality of friction engagement elements, each of which is held in an engaged state or disengaged state depending on the selected shift range. The hydraulic circuit 21 includes a plurality of solenoid valves 23, each of which is provided to hydraulically drive each corresponding one of the friction engagement elements. Thereby, each of the friction engagement elements is engaged or disengaged by the hydraulic pressure supplied from the corresponding solenoid valve 23.

The AT-ECU 12 is electrically connected to the corresponding electric components, such as the solenoid valves 23 of the hydraulic circuit 21. Thereby, the AT-ECU 12 electrically controls an output hydraulic pressure of each of the solenoid valves 23. As a result, the AT-ECU 12 controls the output hydraulic pressure of each of the solenoid valves 23 to engage or disengage each corresponding friction engagement element. Furthermore, in the present embodiment, the AT-ECU 12 is electrically connected to a vehicle speed sensor 24, which senses a traveling speed of the vehicle based on, for example, a rotational speed of an output shaft of the automatic transmission 20. The AT-ECU 12 receives a measurement signal, which is outputted from the vehicle speed sensor 24, to sense the vehicle speed. Then, the AT-ECU 12 controls each corresponding solenoid valve 23 based on the sensed vehicle speed.

Figure 3:
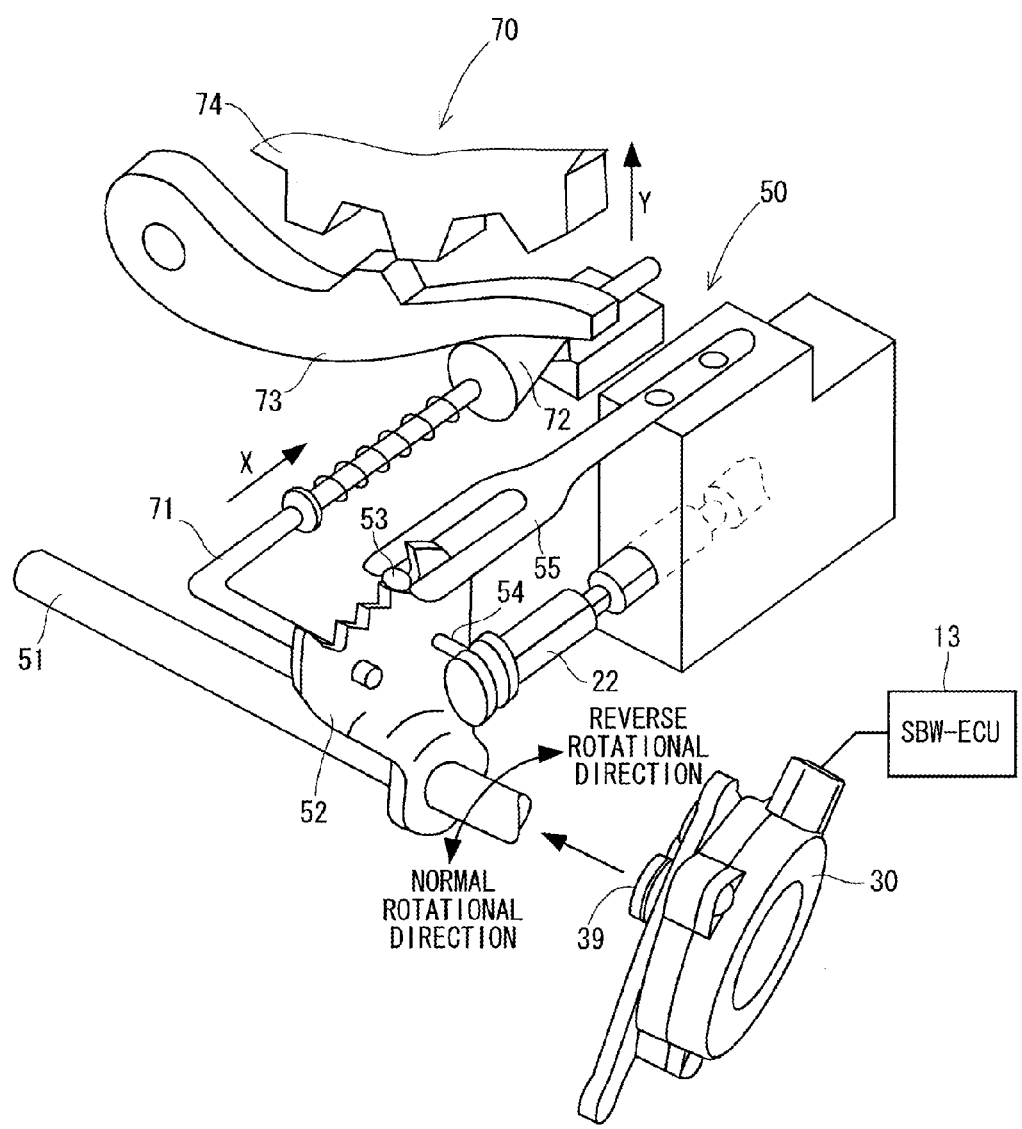
FIG. 3 is a schematic perspective view showing a range shift mechanism and components therearound in the shift-by-wire system of the first embodiment.

The shift-by-wire system 3 includes the manual valve 22 of the automatic transmission control system 2, an actuator 30 and a range shift mechanism 50. The actuator 30 drives a parking lock mechanism 70 (FIG. 3). The SBW-ECU 13 is one of the components of the shift-by-wire system 3. The actuator 30, which is of an electromagnetic drive type, includes an electric motor unit (hereinafter simply referred to as a motor unit) 32, an encoder (serving as a rotational position sensing device) 34 and a speed reducing unit 33.

Figure 2:
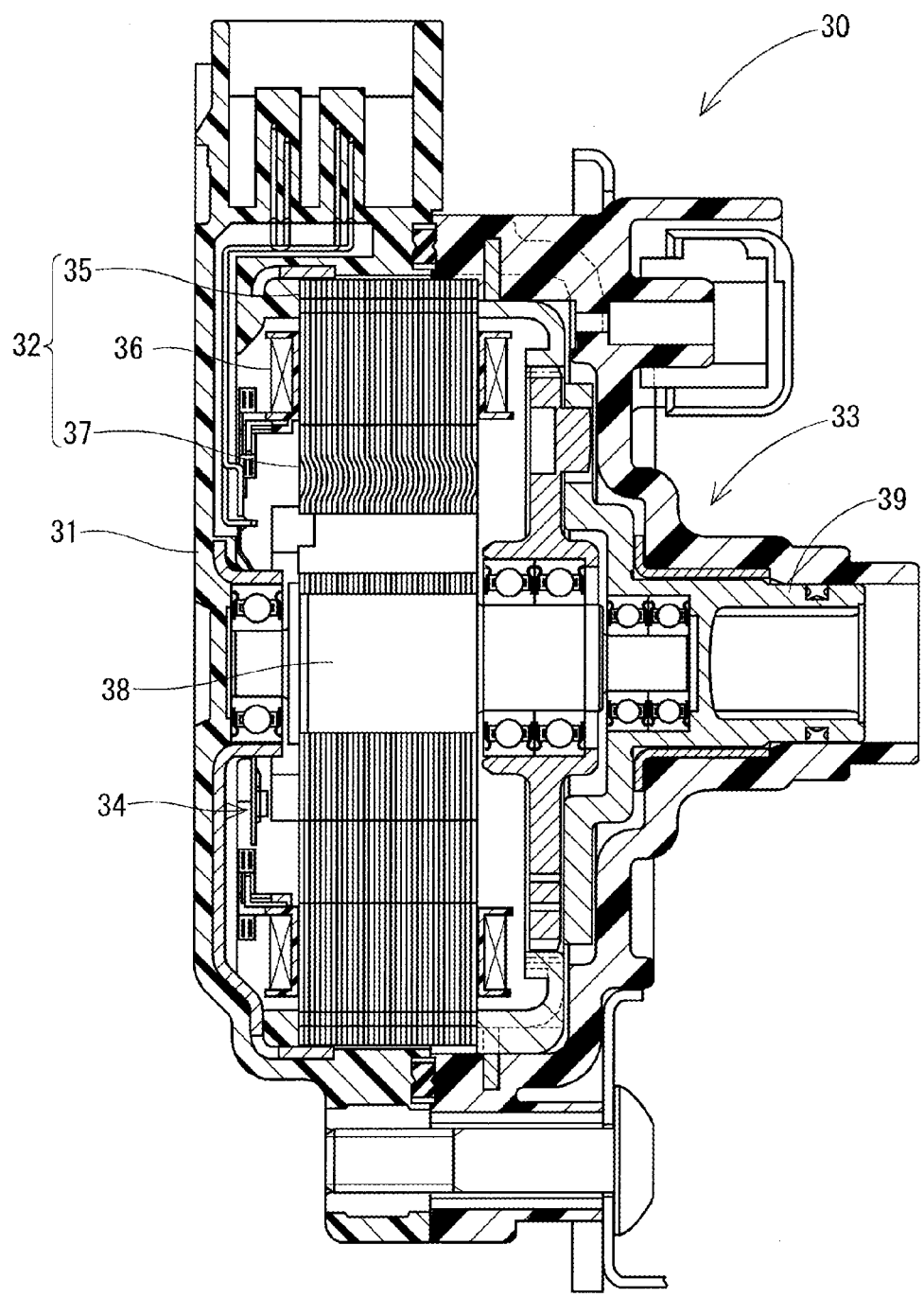
FIG. 2 is a cross-sectional view showing an actuator of the shift-by-wire system of the first embodiment.

Now, the actuator 30 will be described. In the present embodiment, the motor unit 32 is a switched reluctance (SR) motor, which is a brushless motor that generates a drive force without using permanent magnets. As shown in FIG. 2, the motor unit 32 includes a stator 35, to which a plurality of coils 36 is fitted such that the coils 36 are arranged one after another in a rotational direction (circumferential direction). Furthermore, the motor unit 32 includes a rotor 37, which is placed radially inward of the stator 35. The rotor 37 includes a shaft member 38 that is placed at a center of the rotor 37. The shaft member 38 is rotatably supported by a housing 31 of the actuator 30.

The SBW-ECU 13 sequentially energizes each corresponding one of the coils 36 of the motor unit 32 at predetermined corresponding timing to rotate the rotor 37 and the shaft member 38.

In the present embodiment, the encoder 34 is placed in an inside of the housing 31 of the actuator 30. The encoder 34 includes a permanent magnet and Hall ICs. The permanent magnet is rotated integrally with the rotor 37. The Hall ICs are installed to a circuit board, which is fixed to the housing 31. The Hall ICs are opposed to the permanent magnet and sense a magnetic flux that is generated from the permanent magnet. The encoder 34 outputs a pulse signal in response to a change in a rotational angle of the motor unit 32 (the rotor 37).

The encoder 34 of the present embodiment is an incremental encoder, which outputs a pulse signal in response to rotation of the motor unit 32. The SBW-ECU 13 decrements (counts down) or increments (counts up) the count value in response to the pulse signal, which is outputted from the encoder 34. Thereby, the SBW-ECU 13 can sense the rotational state (e.g., a rotational position and a rotational direction) of the motor unit 32 (the rotor 37). The SBW-ECU 13 can drive, i.e., rotate the motor unit 32 at a high rotational speed without causing desynchronization of the motor unit 32 by sensing the rotational state of the motor unit 32 through the encoder 34. Every time the electric power source of the vehicle is turned on (every time the shift-by-wire system 3 is turned on), an initial drive control operation for executing magnetizing/energizing phase learning of the motor unit 32 (synchronizing of the count value, which corresponds to the pulse signal outputted from the encoder 34, with the energizing phase) is performed. With this initial drive control operation, the rotation of the actuator 30 can be appropriately controlled.

The speed reducing unit 33 reduces the rotational speed of the rotation of the motor unit 32 (the shaft member 38) and outputs the rotation of the reduced rotational speed from the output shaft 39 to the range shift mechanism 50. The range shift mechanism 50 transmits the rotational drive force, which is outputted from the speed reducing unit 33, to the manual valve 22 and the parking lock mechanism 70.

With reference to FIG. 3, the range shift mechanism 50 includes a manual shaft 51, a detent plate 52, a detent spring 55 and the manual valve 22. The manual shaft 51 is connected to the output shaft 39 of the speed reducing unit 33 of the actuator 30 by spline coupling. In this way, the manual shaft 51 is rotated by the rotational drive force of the motor unit 32.

The detent plate 52 radially outwardly extends from the manual shaft 51 and is integrated with the manual shaft 51. Thereby, the detent plate 52 is rotated integrally with the manual shaft 51 by the actuator 30. The detent plate 52 has a pin 54, which projects from the detent plate 52 in parallel with the manual shaft 51. The pin 54 is connected to the manual valve 22. Thereby, when the detent plate 52 is rotated together with the manual shaft 51, the manual valve 22 is reciprocated in the axial direction. That is, the range shift mechanism 50 converts the rotational drive force of the actuator 30 into the linear motion and transmits the linear motion to the manual valve 22.

Figure 4:
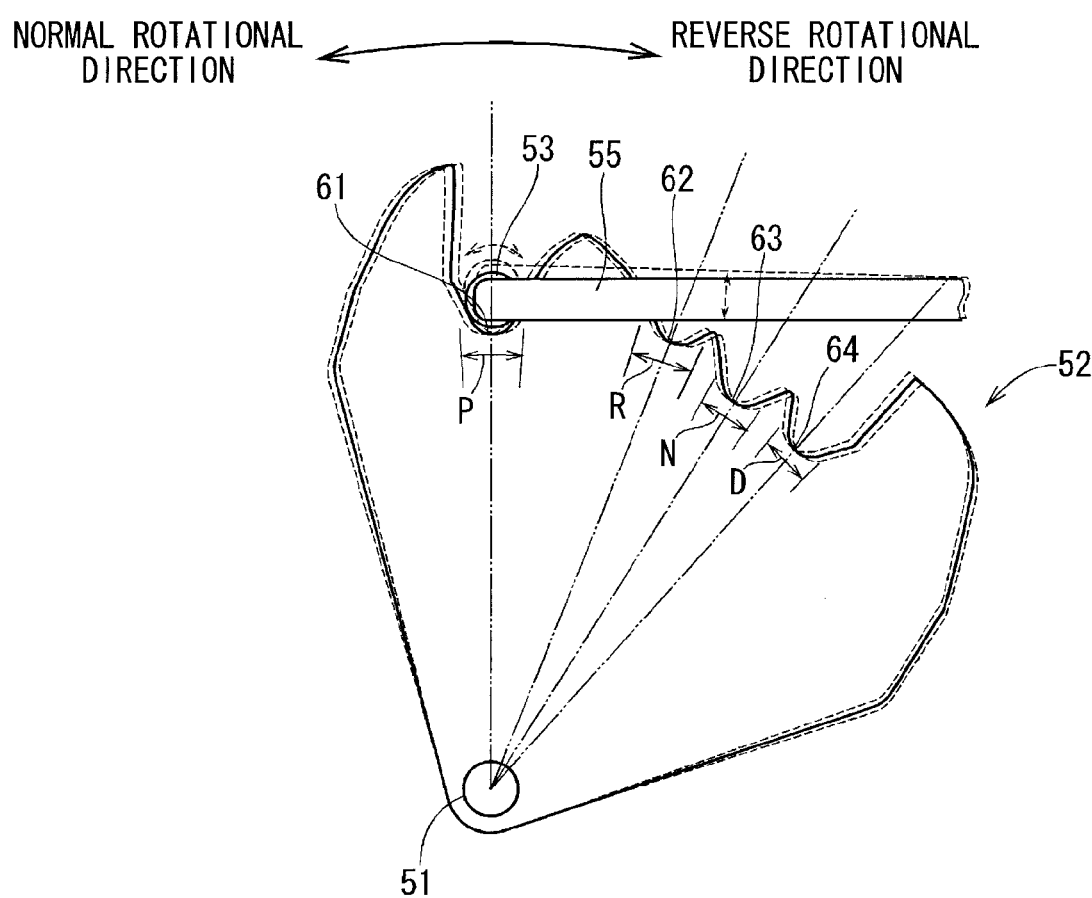
FIG. 4 is a schematic diagram showing an operational state of a detent plate of the shift-by-wire system upon placement of the shift range in a P-range.

With reference to FIG. 4, the detent plate 52 includes a plurality of recesses 61-64, which are placed one after another along an outer peripheral part of the detent plate 52 that is located radially outward of the manual shaft 51. The recess 61 is formed at one circumferential side of the detent plate 52, which is located at one side in the rotational direction. The recess 64 is formed at the other circumferential side of the detent plate 52, which is located at the other side in the rotational direction, i.e., is opposite from the one circumferential side in the rotational direction. The recess 62 and the recess 63 are located between the recess 61 and the recess 64 in the rotational direction. The recesses 61-64 serve as recesses of the present disclosure.

In the present embodiment, the recess 61 is formed to correspond with the P-range of the automatic transmission. The recess 62 is formed to correspond with the R-range. The recess 63 is formed to correspond with the N-range. The recess 64 is formed to correspond with the D-range.

The detent spring 55 is formed as a resiliently deformable elongated plate and includes a detent roller 53 that is placed at a distal end portion of the detent spring 55 and serves as a limiting portion. The detent spring 55 urges the detent roller 53 toward the center (i.e., toward the manual shaft 51) of the detent plate 52. In other words, the detent spring 55 urges the detent roller 53 in a recessing direction of the corresponding recess 61-64, in which the detent roller 53 is fitted. when a predetermined force is applied to the detent plate 52 in the rotational direction through the manual shaft 51, the detent roller 53 is moved from one of the recesses 61-64 to an adjacent one of the recesses 61-64 after passing through a projection interposed between the one of the recesses 61-64 and the adjacent one of the recesses 61-64. Therefore, when the manual shaft 51 is rotated by the actuator 30, the axial position of the manual valve 22 and the state of the parking lock mechanism 70 are changed. Thereby, the shift range of the automatic transmission 20 is changed, i.e., is shifted. When the detent roller 53 passes each projection formed between the corresponding adjacent two of the recesses 61-64, the detent spring 55 is resiliently deformed. Furthermore, at this time, the detent roller 53 moves from the one of the recesses 61-64 to the adjacent one of the recesses 61-64 through the corresponding projection while the detent roller 53 is rotated about a rotational axis thereof.

When the detent roller 53 is held in one of the recesses 61-64, the rotation of the detent plate 52 is limited. Thereby, the axial position of the manual valve 22 and the operational state of the parking lock mechanism 70 are determined. In this way, the shift range of the automatic transmission 20 is set (maintained).

In the present embodiment, with reference to FIG. 4, the rotational direction of the output shaft 39 of the actuator 30 at the time of changing the shift range from the P-range side to the D-range side through the R-range and the N-range is defined as a normal rotational direction. In contrast, the rotational direction of the output shaft 39 of the actuator 30 at the time of changing the shift range from the D-range side to the P-range side through the N-range and the R-range is defined as a reverse rotational direction.

FIG. 3 shows the operational state of the parking lock mechanism 70, in which the shift range is the D-range, i.e., the shift range is other than the P-range. In this operational state, a parking gear 74 is not locked by a parking lock pole 73. Therefore, the rotation of the wheels of the vehicle is enabled. From this operational state, when the output shaft 39 of the actuator 30 is rotated in the reverse rotational direction, the rod 71 is urged in a direction of an arrow X in FIG. 3 through the detent plate 52. Thereby, a tapered portion 72, which is formed in a distal end portion of the rod 71, urges the parking lock pole 73 upwardly in a direction of an arrow Y in FIG. 3. Therefore, the parking lock pole 73 is meshed with the parking gear 74, and thereby the parking gear 74 is locked. As a result, the wheels of the vehicle are placed in the state where the rotation of the wheels is disabled, i.e., is limited. At this time, the detent roller 53 of the detent spring 55 is placed in the state where the detent roller 53 is held in the recess 61 (the state where the detent roller 53 is placed in the center of the recess 61 shown in FIG. 4), and the actual range of the automatic transmission 20 is the P-range.

As discussed above, in the present embodiment, the detent spring 55 urges the detent roller 53 in the recessing direction of the corresponding recess 61-64, in which the detent roller 53 is fitted. Therefore, in the case where the motor unit 32, which rotates the detent plate 52, is stopped, i.e., where the energization of the motor unit 32 (more specifically all of the coils 36) is stopped, when the detent roller 53 is not held in the center (the deepest location) in the corresponding recess 61-64, the detent roller 53 is urged in the recessing direction of the corresponding recess 61-64 by the detent spring 55. Therefore, the detent plate 52 is rotated, and thereby the detent roller 53 is moved toward the center of the corresponding recess 61-64. In this way, the detent plate 52 swings such that the detent roller 53 coincides with the center of the recess 61-64. Therefore, when the predetermined time period elapses, the center of the detent roller 53 and the center of the corresponding recess 61-64 generally coincide with each other. Thereby, the shift range of the automatic transmission 20 is set to the predetermined range. In view of the relative position of the detent roller 53 relative to the detent plate 52, when the detent roller 53 is urged in the recessing direction of the corresponding recess 61-64 by the detent spring 55, the detent plate 52 is rotated. This rotatable extent of the detent plate 52 will be referred to as a drawing extent.

In the present embodiment, with the above construction, when the detent plate 52 is rotated by the motor unit 32, the detent plate 52 swings in the rotational direction (the normal rotational direction or the reverse rotational direction) for a while immediately after the shifting of the shift range to the target range. In FIG. 4, the detent plate 52, the detent spring 55 and the detent roller 53 in the state immediately after the shifting of the shift range to the P-range are indicated by solid lines. Furthermore, the detent plate 52, the detent spring 55 and the detent roller 53 in the state where the detent plate 52 swings, are indicated by dotted lines. A length of the swing time period of the detent plate 52 (i.e., a time period from a time point of starting the swing motion of the detent plate 52 to a time point of stopping the swing motion of the detent plate 52 immediately after the shifting of the shift range to the target range) may vary depending on, for example, the component size tolerances of the range shift mechanism 50, the control accuracy of the motor unit 32 and environmental conditions (e.g., environmental temperature condition).

The SBW-ECU 13 is electrically connected to the motor unit 32 and the encoder 34 of the actuator 30 and the selector sensor 46 of the range selector 45 (possibly serving as a shift range selecting device or a shift range selecting means).

The selector sensor 46 senses a command range, which is a range commanded by a driver (user) of the vehicle through manipulation of the range selector 45. The selector sensor 46 outputs the sensed signal to the SBW-ECU 13.

The SBW-ECU 13 determines a target range based on the signal, which is outputted from the selector sensor 46 and is relevant to the command range. Specifically, in the present embodiment, the target range is determined based on the signal of the selector sensor 46, the signal of the brake and the signal of the vehicle speed sensor 24. Here, the SBW-ECU 13 may possibly function as a target range determining means of the present disclosure. The SBW-ECU 13 controls the rotation of the actuator 30 such that the shift range of the automatic transmission 20 is held to coincide with the target range, which is determined by the SBW-ECU 13 (the target range determining means). In this way, the actual range of the automatic transmission 20 is changed to the intended range that is specified by the driver.

As discussed above, normally, the SBW-ECU 13 senses the rotational position of the rotor 37 relative to the stator 35 based on the pulse signal count value received from the encoder 34 and sequentially shifts the energizing phase (current supply phase) of the motor unit 32 among, for example, a U-phase, a V-phase and a W-phase based on the sensed rotational position of the rotor 37. That is, the electric current is sequentially supplied to the coils 36 of each corresponding phase (the U-phase, the V-phase, the W-phase). Thereby, the rotor 37 is driven to the target rotational position, which corresponds to the target range. That is, the SBW-ECU 13 shifts the shift range to the target range by rotating the motor unit 32 while using the feedback of the rotational state of the rotor 37 (the motor unit 32). The control operation of the SBW-ECU 13 discussed above will be hereinafter referred to as a feedback drive control operation. Here, the SBW-ECU 13 may possibly function as a range shifting means of the present disclosure.

As discussed above, the encoder 34 of the present embodiment is the incremental encoder, so that the encoder 34 senses only the relative rotational position of the motor unit 32. Thus, at the time of shifting the shift range to the desired range by rotating the actuator 30, it is necessary to learn a reference position, which corresponds to an absolute position of the manual shaft 51 connected to the output shaft 39 of the actuator 30. After completion of the learning of the reference position of the actuator 30, a rotational position of the actuator 30, which corresponds to the desired shift range, is computed based on the learned reference position and a predetermined rotational amount (a control constant). Then, the actuator 30 is rotated to the computed rotational position, so that the actual range is shifted to the desired range. In the present embodiment, the SBW-ECU 13 learns a reference position of the actuator 30, which corresponds to an end portion (the P-range or the D-range) of a rotatable range of the detent plate 52. In this embodiment, the SBW-ECU 13 can indirectly sense the rotational position of the manual shaft 51 based on the pulse signal outputted from the encoder 34. That is, the SBW-ECU 13 and the encoder 34 may possibly serve as a rotational position sensing means of the present disclosure.

Furthermore, after completion of the learning of the reference position, the SBW-ECU 13 can indirectly determine the current actual range based on the learned reference position and the pulse signal outputted from the encoder 34. More specifically, for example, the ROM of the SBW-ECU 13 stores a map, which indicates a relationship between each actual range and a pulse count value (the number of pulses), which is generated upon rotation of the detent plate 52 from the reference position to the actual range. Then, the SBW-ECU 13 determines the current actual range based on the map, the reference position and the pulse signal outputted from the encoder 34. That is, the SBW-ECU 13 determines the current actual range by determining whether the center of the detent roller 53 is located in an extent (a range determination extent) of any one of the shift ranges (the P-range, the R-range, the N-range and the D-range), i.e., by determining whether the rotational position of the manual shaft (the detent plate 52) is within the range determination extent of any one of the shift ranges (the P-range, the R-range, the N-range and the D-range). Here, the SBW-ECU 13 may possibly function as a range determining means of the present disclosure.

The SBW-ECU 13 outputs the signal, which indicates the determined actual range, to the EC-ECU 14. In the present embodiment, the SBW-ECU 13 displays the information of the determined actual range on a display device 47, which is placed at a front side of a driver's seat in a passenger compartment of the vehicle, through the integrative ECU 10. In this way, the driver can visually check the current actual range.

The EC-ECU 14 is electrically connected to a throttle 41 of an internal combustion engine (hereinafter simply referred to as an engine) 40 of the vehicle, injectors 42 and an accelerator sensor 44 of an accelerator pedal 43. The throttle 41 adjusts a flow quantity of intake air that flows through an intake air passage of the engine 40. Each injector 42 adjusts an injection quantity of fuel, which is injected into the intake air passage or a corresponding one of cylinders of the engine 40. The accelerator sensor 44 senses an operational amount (amount of depression) of the accelerator pedal 43, which is operated by the driver of the vehicle, and the accelerator sensor 44 outputs a measurement signal to the EC-ECU 14, which indicates the sensed operational amount of the accelerator pedal 43. With the above-described construction, when the accelerator pedal 43 is operated by the driver of the vehicle, the EC-ECU 14 electrically controls the throttle 41 and the injectors 42 based on the operation of the accelerator pedal 43 and the signal, which indicates the actual range and is received from the SBW-ECU 13. Therefore, the EC-ECU 14 adjusts the rotational speed and the output torque of the engine 40.

In the state where the SBW-ECU 13 is currently performing the feedback drive control operation, when the transmission of the pulse signal from the encoder 34 is temporarily interrupted for some reason, or when a noise, which overlaps the signal transmitted through the signal line of the encoder 34, is erroneously interrupted as the normal pulse signal, or when the rotation of the rotor 37 is desynchronized, the energizing phase and the rotational phase of the rotor 37 cannot be synchronized with each other, and thereby the rotor 37 cannot be rotated in the normal manner. In this way, the rotation of the rotor 37 may possibly be stopped, or the rotational direction of the rotor 37 may possibly be reversed. Therefore, in the present embodiment, the SBW-ECU 13 always monitors the energizing state of the motor unit 32 and the pulse signal from the encoder 34. When the SBW-ECU 13 senses the abnormality about the pulse signal discussed above or the like, the SBW-ECU 13 determines that the encoder 34 is in the abnormal state (sensing the abnormality of the encoder 34). When the SBW-ECU 13 determines that the encoder 34 is in the abnormal state, the SBW-ECU 13 changes a value of an abnormality flag of the encoder 34 from 0 to 1 and stores it in the RAM.

In the present embodiment, the SBW-ECU 13 prohibits the determination of the actual range throughout a period of rotating the motor unit 32, which is rotated to shift the shift range. That is, the SBW-ECU 13 prohibits the determination of the actual range throughout a time period from a start time point, at which the rotation of the rotor 37 of the motor unit 32 toward the target rotational position is started, to an end time point, at which the rotor 37 reaches the target rotational position. Specifically, the SBW-ECU 13 does not determine the actual range during the period of rotating the motor unit 32. Therefore, the SBW-ECU 13 does not output the determination result of the actual range to the EC-ECU 14 during the period of rotating the motor unit 32, so that the display of the actual range on the display device 47 will not be changed to a display of another range. Here, the SBW-ECU 13 may possibly function as a determination prohibiting means of the present disclosure. Furthermore, the time period from the start time point, at which the rotation of the rotor 37 of the motor unit 32 toward the target rotational position is started, to the end time point, at which the rotor 37 reaches the target rotational position, may correspond to a range determination operation prohibiting period of the present disclosure.

Next, an actual range determination operation, which is executed by the SBW-ECU 13, will be described with reference to FIG. 5.

Figure 5:
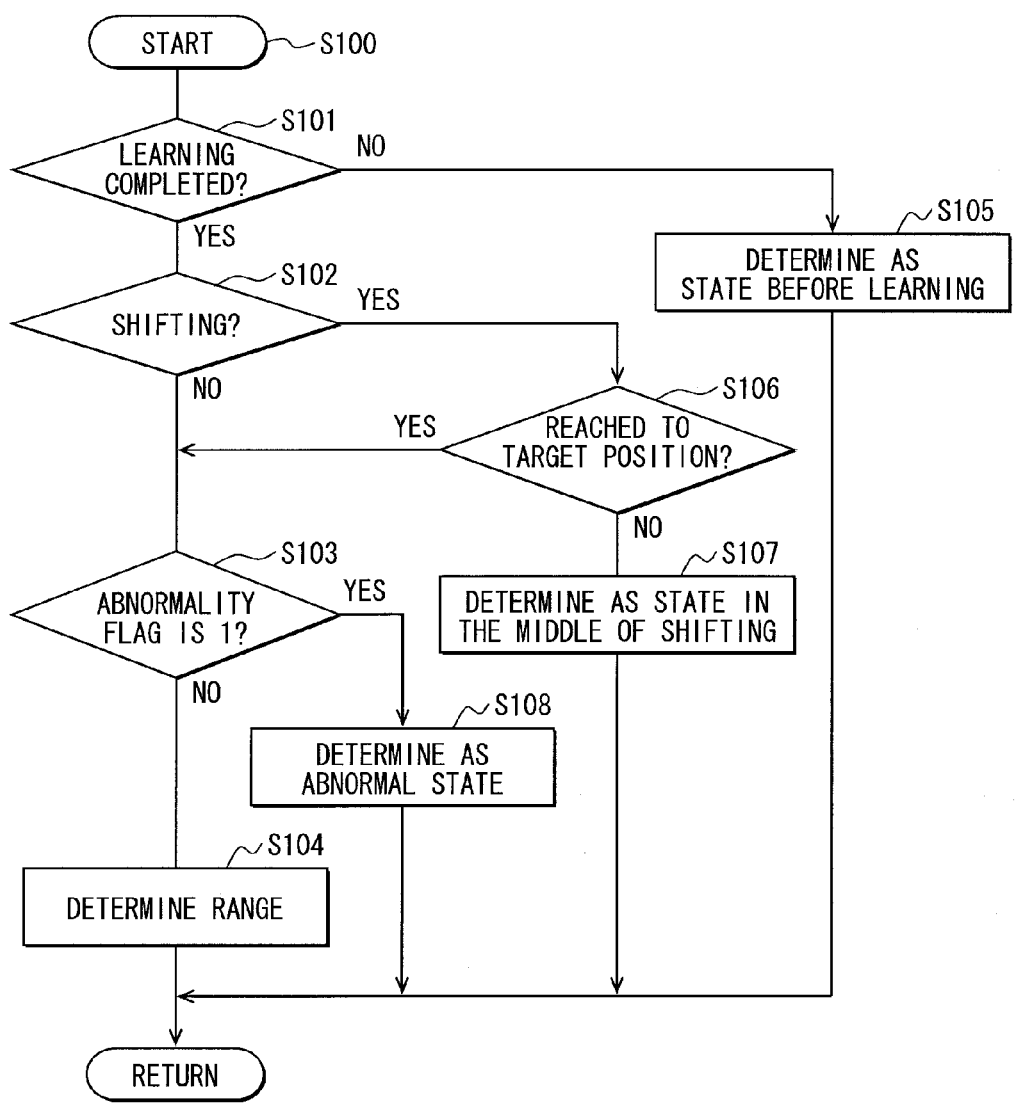
FIG. 5 is a flowchart showing a flow of a range determination operation that is executed at the shift-by-wire system of the first embodiment.

FIG. 5 shows a flow (S100) of the range determination operation executed by the SBW-ECU 13. This operation flow S100 starts, for example, when the vehicle power source is turned on (e.g., upon turning on of an ignition key of the vehicle).

At step S101, the SBW-ECU 13 determines whether an initial learning operation is completed. Specifically, it is determined whether "the magnetizing/energizing phase learning of the motor unit 32" and "the reference position learning" discussed above are completed as the initial learning operation. When it is determined that the initial learning operation is completed at step S101 (i.e., YES at step S101), the SBW-ECU 13 proceeds to step S102. In contrast, when it is determined that the initial learning operation is not completed at step S101 (i.e., NO at step S101), the SBW-ECU 13 proceeds to step S105.

At step S102, the SBW-ECU 13 determines whether it is the middle of the range shifting operation for shifting the shift range of the automatic transmission 20. Specifically, the SBW-ECU 13 determines whether it is the middle of the range shifting operation based on, for example, the energization state (electric power supply state) of the motor unit 32 and the comparison between the target range and the current actual range (i.e., a result of determination of whether the target range and the current actual range coincides with each other). When the SBW-ECU 13 determines that it is the middle of the range shifting operation at step S102 (i.e., YES at step S102), the SBW-ECU 13 proceeds to step S106. When the SBW-ECU 13 determines that it is not the middle of the range shifting operation at step S102 (i.e., NO at step S102), the SBW-ECU 13 proceeds to step S103.

At step S103, the SBW-ECU 13 checks the value of the abnormality flag of the encoder 34 to see whether the value of the abnormality flag is 1. When the value of the abnormality flag of the encoder 34 is 1 (i.e., YES at step S103), the SBW-ECU 13 proceeds to step S108. When the value of the abnormality flag of the encoder 34 is 0 (i.e., NO at step S103), the SBW-ECU 13 proceeds to step S104.

At step S104, the SBW-ECU 13 enables the range determination operation and determines the current shift range (actual range). Specifically, the SBW-ECU 13 determines the actual range by identifying one of the range determination extents of the detent plate 52, which corresponds to the rotational position of the manual shaft 51 (the detent plate 52) to determine the actual range. The SBW-ECU 13 outputs the signal, which indicates the determined actual range, to the EC-ECU 14 and the integrative ECU 10. Thereafter, the SBW-ECU 13 terminates the operation flow S100 of FIG. 5. However, at this time, when the electric power source of the vehicle is still turned on, the SBW-ECU 13 repeats the operation flow S100 of FIG. 5.

At step S105, the SBW-ECU 13 determines that it is before the execution of the initial learning operation (i.e., the state before the learning). Thereafter, the SBW-ECU 13 terminates the operation flow S100 of FIG. 5. However, at this time, when the electric power source of the vehicle is still turned on, the SBW-ECU 13 repeats the operation flow S100 of FIG. 5.

At step S106, the SBW-ECU 13 determines whether the motor unit 32 has reached to the target rotational position. When it is determined that the motor unit 32 has reached to the target rotational position at step S106 (i.e., YES at step S106), the SBW-ECU 13 proceeds to step S103. In contrast, when it is determined that the motor unit 32 has not reached to the target rotational position at step S106 (i.e., NO at step S106), the SBW-ECU 13 proceeds to step S107.

At step S107, the SBW-ECU 13 determines that it is still in the middle of shifting the shift range (i.e., the state in the middle of shifting the shift range). Thereafter, the SBW-ECU 13 terminates the operation flow S100 of FIG. 5. However, at this time, when the electric power source of the vehicle is still turned on, the SBW-ECU 13 repeats the operation flow S100 of FIG. 5.

At step S108, the SBW-ECU 13 determines that the state of the encoder 34 is abnormal (i.e., the state is the abnormal state). Thereafter, the SBW-ECU 13 terminates the operation flow S100 of FIG. 5. However, at this time, when the electric power source of the vehicle is still turned on, the SBW-ECU 13 repeats the operation flow S100 of FIG. 5.

As discussed above, the SBW-ECU 13 enables the range determination operation of determining the shift range (the actual range) only when it is not in the middle of the range shifting operation for shifting the shift range of the automatic transmission 20. Specifically, the SBW-ECU 13 prohibits the determination of the actual range in the middle of the range shifting operation (the range determination operation prohibiting period that is the time period from the start time point, at which the rotation of the motor unit 32 toward the target rotational position is started, to the end time point, at which the motor unit 32 reaches the target rotational position).

After steps S104, S105, S107, S108, the SBW-ECU 13 terminates the operation flow S100 of FIG. 5. However, at this time, when the electric power source of the vehicle is still turned on, the SBW-ECU 13 repeats the operation flow S100 of FIG. 5. That is, the operation flow S100 is the operation that is repeated as long as the electric power source of the vehicle is turned on.

Figure 6:
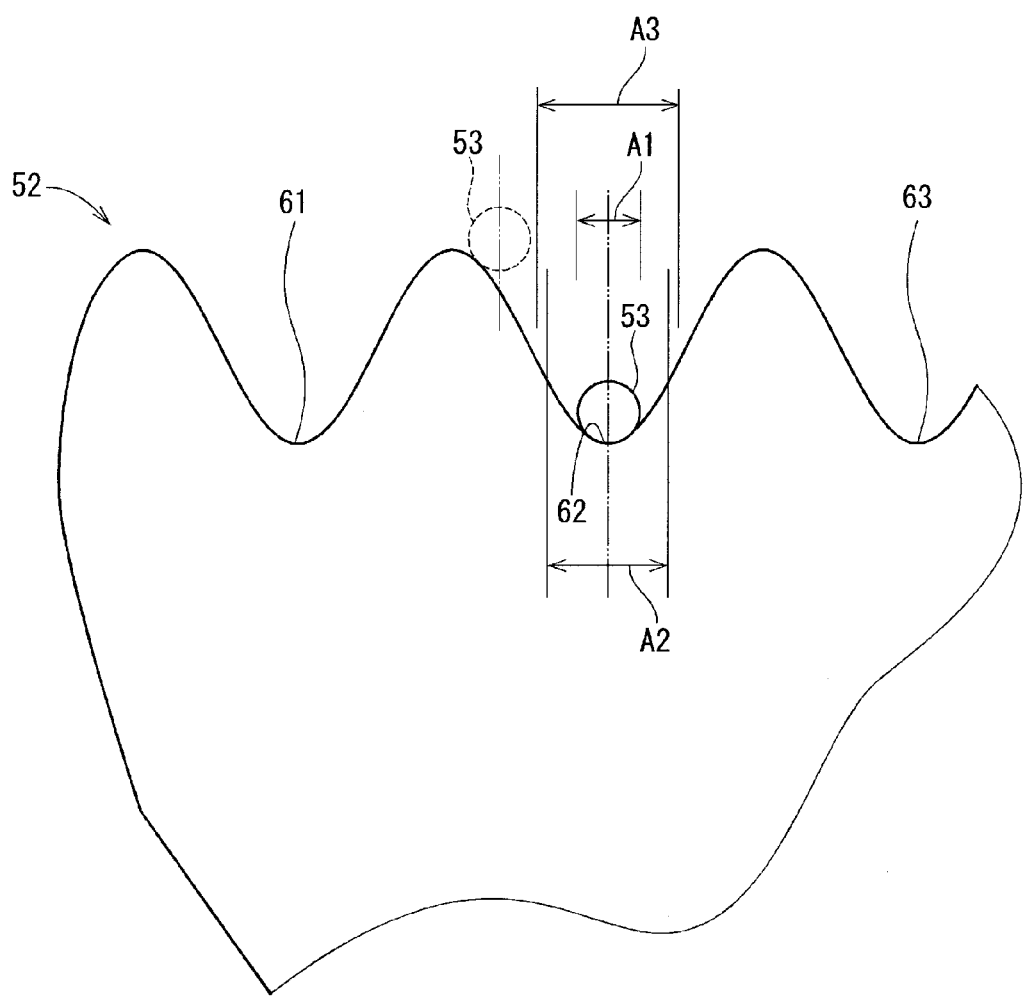
FIG. 6 is a partial enlarged schematic view of the detent plate of the shift-by-wire system of the first embodiment.

FIG. 6 shows the detent plate 52 and the detent roller 53 after shifting of the shift range of the automatic transmission 20 from the P-range to the R-range. With reference to FIG. 6, a reference sign A1 indicates an extent of positioning point variation, which is an extent of variation (dispersion) in the rotational positioning point of the detent plate 52 that is rotated and is positioned to the corresponding positioning point, which corresponds to the R-range in this instance by the motor unit 32 according to the present embodiment. Specifically, the extent A1 of positioning point variation is an extent of the variation in the rotational positioning point of the detent plate 52 (in this embodiment, the rotational positioning point of the detent plate 52 is a point where the center of the detent roller 53 coincides with the center of the recess 62 of the R-range in the case of FIG. 6). This extent A1 of positioning point variation may substantially vary depending on, for example, the size tolerances of the range shift mechanism 50, the amount of play between the connected components, which are connected with each other, and the control accuracy of the motor unit 32.

In the present embodiment, due to the presence of the extent A1 of the positioning point variation of the motor unit 32, the center of the detent roller 53 relative to the detent plate 52 is assumed to be within the extent A1 in the state where the rotation of the motor unit 32 is stopped through turning off of the energization of all of the coils 36 upon reaching of the motor unit 32 to the target rotational position. In FIG. 6, an extent A2 is an extent (range determination extent) of the count value of the encoder 34 for the R-range. That is, when the count value is within this extent A2, the shift range is determined to be the R-range. This extent A2 is set to correspond with an extent of variation in the count value of the encoder 34 at the position where the center of the detent roller 53 is in the center (the deepest point) of the recess 62. This extent A2 of count value variation substantially varies depending on, for example, the size tolerances of the range shift mechanism 50, and the amount of play between the connected components, which are connected with each other. The extent A2 is set to be an extent where it is possible to reliably determine that the current range is the R-range upon placement of the center of the detent roller 53 in the center (the deepest point) of the recess 62.

In the present embodiment, as discussed above, the SBW-ECU 13 prohibits the determination of the actual range in the middle of the range shifting operation (the range determination operation prohibiting period that is the time period from the start time point, at which the rotation of the motor unit 32 toward the target rotational position is started, to the end time point, at which the motor unit 32 reaches the target rotational position in this particular embodiment). Therefore, it is possible to limit the erroneous determination of the actual range even in the presence of the count value variation of the encoder 34 when the detent roller 53 is located in, for example, a position indicated by a dotted line in FIG. 6 (the middle of shifting from the P-range to the R-range).

The SBW-ECU 13 enables the determination of the actual range after the completion of the shifting of the shift range. In the present embodiment, the detent roller 53 is supposed to be located in the extent A1 after the completion of the shifting of the shift range (after the stopping of the rotation of the motor unit 32). Therefore, when the actual range is determined after the completion of the shifting of the shift range, the actual range can be reliably determined as the R-range.

In the present embodiment, with reference to FIG. 6, when the detent roller 53 is placed in an extent A3 (an extent that meets a range determination requirement), it is possible to determine that the shift range is the R-range in terms of the mechanical structure. This extent A3 is set to be larger than the extent A1 of positioning point variation of the motor unit 32. As discussed above, in the present embodiment, the actual range determination operation is executed when the detent roller 53 is assumed to be located in the extent A1. Therefore, it is possible to limit the erroneous determination of the actual range. Thus, this determination operation is suitable for the shift-by-wire system 3, in which the extent A3 is set to be larger than the extent A1.

In the present embodiment, the range determination extent is set for each of the other ranges, which are other than the R-range, in a manner similar to that of the R-range discussed above. The actual range is determined by determining the corresponding one of the range determination extents of the ranges, in which the rotational position of the detent plate 52 (the manual shaft 51) is assumed to be located.

As discussed above, in the present embodiment, the SBW-ECU 13 prohibits the determination of the actual range until the end of the range determination operation prohibiting period that is the time period from the start time point, at which the rotation of the rotor 37 toward the target rotational position is started, to the end time point, at which the rotor 37 reaches the target rotational position. In the present embodiment, the SBW-ECU 13 determines the actual range after the stopping of the rotation of the detent plate 52, which is rotated by the motor unit 32, or after reaching of the rotation of the detent plate 52, which is rotated by the motor unit 32, to the target rotational position. Therefore, the actual range is determined in the state where the center (the deepest point) of the corresponding recess 61-64 of the detent plate 52 and the center of the detent roller 53 of the detent spring 55 are close to each other or substantially coincide with each other. In other words, the actual range is determined in the state where the distance between the center (the deepest point) of the corresponding recess 61-64 of the detent plate 52 and the center of the detent roller 53 of the detent spring 55 is relatively small or is minimized. Thus, the erroneous determination of the actual range by the SBW-ECU 13 can be limited.

Second Embodiment

The shift-by-wire system of a second embodiment will be described with reference to FIGS. 7 and 8. The physical structure of the shift-by-wire system of the second embodiment is the same as that of the first embodiment. However, the process of the actual range determination operation of the second embodiment differs from that of the first embodiment.

Figure 7:
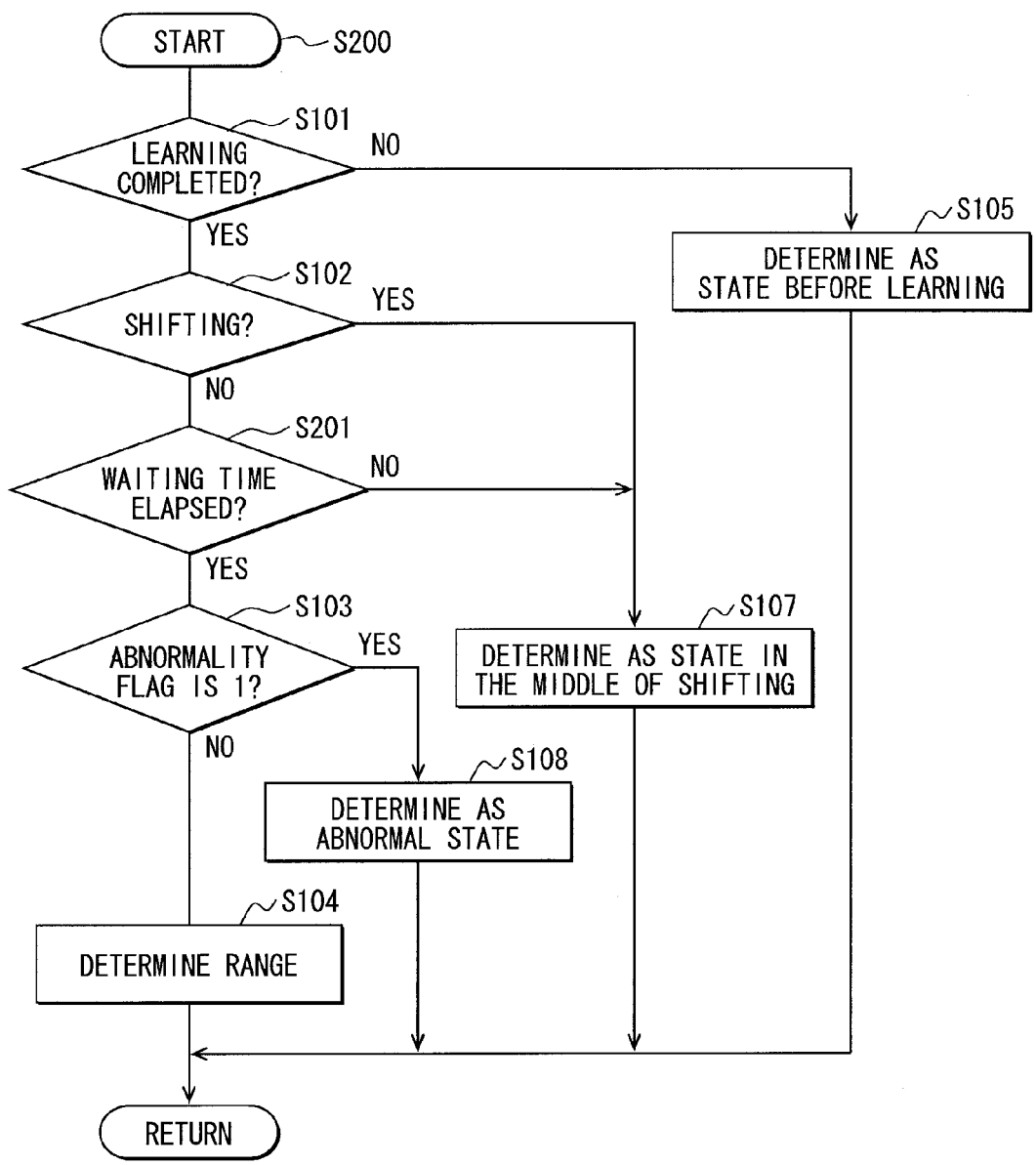
FIG. 7 is a flowchart showing a flow of a range determination operation that is executed at a shift-by-wire system of a second embodiment of the present disclosure.

FIG. 7 shows a flow (S200) of the range determination operation executed by the SBW-ECU 13 in the second embodiment. This operation flow S200 starts, for example, when the vehicle power source is turned on (e.g., upon turning on of an ignition key of the vehicle).

Steps S101-S105, S107-S108 are substantially the same as steps S101-S105, S107-S108 of the operation flow S100 of the first embodiment (see FIG. 5) and will not be described for the sake of simplicity. The operation flow S200 differs from the operation flow S100 such that step S201 is placed between step S102 and step S103, and step S106 is eliminated.

Step S201 is executed when the SBW-ECU 13 determines that it is not in the middle of the range shifting operation for shifting the shift range of the automatic transmission 20 at step S102 (i.e., NO at step S102). At step S201, the SBW-ECU 13 determines whether a waiting time period has elapsed. The waiting time period is a predetermined time period from a start time point of the waiting time period, at which the energization of all of the coils 36 is turned off upon reaching of the motor unit 32 to the target rotational position through the feedback drive control operation of the SBW-ECU 13, to an end time point, at which this predetermined time period (the waiting time period) ends. Desirably, this waiting time period is set to be equal to or longer than the swing time period of the detent plate 52. When it is determined that the waiting time period has elapsed at step S201 (i.e., YES at step S201), the SBW-ECU 13 proceeds to step S103. In contrast, when it is determined that the waiting time period has not been elapsed at step S201 (i.e., NO at step S201), the SBW-ECU 13 proceeds to step S107.

In the present embodiment, a sum of "the time period from the start time point, at which the rotation of the rotor 37 of the motor unit 32 toward the target rotational position is started through the feedback drive control operation, to the end time point, at which the energization of all of the coils 36 is turned off upon reaching of the rotor 37 to the target rotational position" and "the waiting time period" corresponds to the range determination operation prohibiting period. Specifically, in the second embodiment, the range determination operation prohibiting period is lengthened by the waiting time period in comparison to the range determination operation prohibiting period of the first embodiment.

Figure 8:
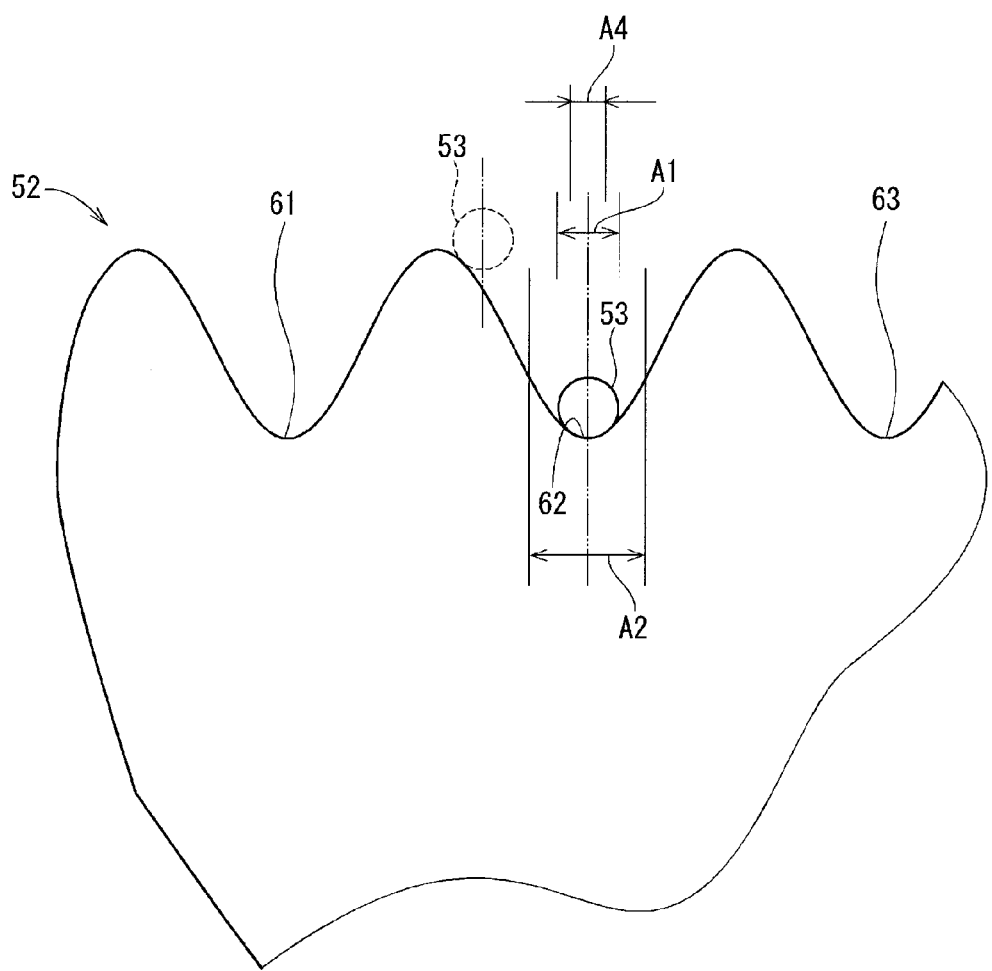
FIG. 8 is a partial enlarged schematic view of a detent plate of the shift-by-wire system of the second embodiment.

FIG. 8 shows the detent plate 52 and the detent roller 53 after shifting of the shift range of the automatic transmission 20 from the P-range to the R-range. When the energization of all of the coils 36 is stopped after the stopping of the rotation of the motor unit 32 at the location where the detent roller 53 is in the drawing extent of the recess (specifically, the drawing extent of the recess 62 in FIG. 8), the detent plate 52 is swung to rotate such that the detent roller 53 is positioned to coincide with the center of the recess 62. Then, after the end of the waiting time period, it is assumed that the center of the detent roller 53 and the center of the recess 62 generally coincide with each other, as shown in FIG. 8.

In the present embodiment, with reference to FIG. 8, when the detent roller 53 is placed in an extent A4 (an extent that meets a range determination requirement), it is possible to determine that the shift range is the R-range in terms of the mechanical structure. This extent A4 is set to be smaller than the extent A1 of positioning point variation of the motor unit 32. As discussed above, in the present embodiment, the actual range determination operation is executed when the center of the detent roller 53 generally coincides with the center of the recess 62. Therefore, it is possible to limit the erroneous determination of the actual range. Thus, this determination operation is suitable for the shift-by-wire system 3, in which the extent A4 is set to be smaller than the extent A1.

In the present embodiment, the range determination extent is set for each of the other ranges, which are other than the R-range, in a manner similar to that of the R-range discussed above. The actual range is determined by determining the corresponding one of the range determination extents of the ranges, in which the rotational position of the detent plate 52 (the manual shaft 51) is assumed to be located.

As discussed above, in the present embodiment, the energization of all of the coils 36 is stopped when the rotation of the detent plate 52 by the motor unit 32 is stopped. Thereafter, when the waiting time period is elapsed, the actual range is determined by the SBW-ECU 13. For example, when the rotation of the motor unit 32 is stopped at the location where the detent roller 53 is in the drawing extent, the detent plate 52 is swung to rotate such that the detent roller 53 is positioned to coincide with the center of the one of the recesses 61-82. Then, after the end of the waiting time period, it is assumed that the center of the detent roller 53 and the center of the recess 61-64 generally coincide with each other. In the present embodiment, at this time (when the center of the detent roller 53 generally coincides with the center of the one of the recesses 61-64 after the end of the waiting time period), the SBW-ECU 13 determines the actual range. Thus, the erroneous determination of the actual range by the SBW-ECU 13 can be limited.

Now, modifications of the above embodiments will be described.

In the first embodiment, the range determination operation prohibiting period is set to be "the time period from the start time point, at which the rotation of the motor unit 32 toward the target rotational position is started by the SBW-ECU 13 (the range shifting means), to the end time point, at which the motor unit 32 reaches the target rotational position." In the second embodiment, the range determination operation prohibiting period is set to be "the time period from the start time point, at which the rotation of the motor unit 32 toward the target rotational position is started by the SBW-ECU 13 (the range switching means), to the end time point, at which the waiting time period ends after reaching of the motor unit 32 to the target rotational position." Alternatively, in one modification of the above embodiments, the range determination operation prohibiting period may be set to "a time period from the start time point, at which the rotation of the motor unit 32 toward the target rotational position is started by the SBW-ECU 13 (the range switching means), to the end time point, at which a predetermined length of time period ends." Furthermore, the waiting time period may be set to any length of time.

In the second embodiment, the flow S200 of the actual range determination operation process is applied to the shift-by-wire system where the extent A4, in which it is possible to determine that the shift range is "the predetermined range" in terms of the mechanical structure, is set to be smaller than the extent A1 of positioning point variation of the motor unit 32. Alternatively, in another modification of the above embodiment, the flow S200 of the actual range determination operation may be applied to the shift-by-wire system where the extent A4, in which it is possible to determine that the shift range is "the predetermined range" in terms of the mechanical structure, is set to be larger than the extent A1 of positioning point variation of the motor unit 32.

Furthermore, in the above embodiments, the detent plate 52 has the four recesses 61-64 (corresponding to the P-range, the R-range, the N-range and the D-range, respectively). Alternatively, in another modification of the above embodiment, the detent plate 52 may have only two recesses (corresponding to the P-range and a not P range). Further alternatively, the detent plate 52 may have six recesses (corresponding to the P-range, the R-range, the N-range, the D-range, the 2nd-range and the L-range, respectively). Also, the detent plate 52 may have any other number of recesses. That is, the number of ranges of the automatic transmission, to which the present disclosure is applied, is not limited to four and may be changed to two or six or any other number.

Furthermore, in the above embodiment, the rotational position of the manual shaft 51 is indirectly sensed with the encoder 34, which outputs the pulse signal that corresponds to the rotation of the rotor 37. Alternatively, in another modification of the above embodiment, the rotational position of the manual shaft 51 may be indirectly sensed with a rotational position sensor (a rotational position sensing means), which senses the rotational position of the output shaft 39 of the actuator 30. Further alternatively, a rotational position sensor (a rotational position sensing means) may be placed around the axis of the manual shaft 51, and the rotational position of the manual shaft 51 may be directly sensed with such a rotational position sensor.

Furthermore, in the above embodiment, the rotational position of the manual shaft 51 is indirectly sensed with the incremental encoder 34. Alternatively, an absolute type encoder (also referred to as an absolute encoder) may be used to directly or indirectly sense the rotational position of the manual shaft 51.

The shift-by-wire system of the present disclosure may be applied to a continuously variable transmission (CVT) or an automatic transmission (NT) of a hybrid vehicle (HV), which shifts the shift range among four positions, i.e., the P-range, the R-range, the N-range and the D-range.

In the above embodiments and the modifications thereof, the SBW-ECU 13 alone or in cooperation with the integrative ECU 10 and/or any other electronic control unit(s) installed in the vehicle may possibly serve as a controller of the present disclosure.

As discussed above, the present disclosure is not limited to the above embodiment, and the above embodiment may be modified in various ways within the spirit and scope of the present disclosure.

What is claimed is:

1. A shift-by-wire system for an automatic transmission of a vehicle, comprising:
    an electric motor unit that includes a rotor, wherein the rotor is rotated when the electric motor unit is energized;
    a manual shaft that is rotated by a drive force outputted from the electric motor unit upon rotation of the rotor;
    a detent plate that includes a plurality of recesses and is fixed to the manual shaft to rotate integrally with manual shaft;
    a detent spring that includes a limiting portion, wherein when the limiting portion is urged in a recessing direction of one of the plurality of recesses of the detent plate and is fitted into the one of the plurality of recesses of the detent plate, the rotation of the detent plate is limited to hold a shift range of the automatic transmission;
    a rotational position sensing device that directly or indirectly senses a rotational position of the manual shaft;
    a target range determination unit that determines a target range of the automatic transmission among a plurality of ranges based on a signal outputted from a shift range selecting device upon manipulation of the shift range selecting device by a driver of the vehicle;
    a range shift unit that shifts the shift range of the automatic transmission to the target range by rotating the rotor of the electric motor unit through energization of the electric motor unit to rotate the manual shaft, so that the rotational position of the manual shaft, which is sensed with the rotational position sensing device, reaches a target rotational position, which corresponds to the target range determined with the target range determination unit;
    a range determination unit that determines whether the rotational position of the manual shaft is in a predetermined extent of the target range based on the rotational position of the manual shaft that is rotated by the range shift unit;
    an actual range determination unit that senses an actual range of the automatic transmission by executing a range determination operation, which determines the actual range of the automatic transmission based on a result of determination of the range determination unit; and
    a determination prohibition unit that prohibits the actual range determination unit from executing the range determination operation throughout a range determination operation prohibiting period, which is a predetermined time period and starts from a time point at which the range shift unit starts rotation of the rotor of the electric motor unit toward the target rotational position.

2. The shift-by-wire system according to claim 1, wherein the determination prohibition unit prohibits the execution of the range determination operation from the time point at which the range shift unit starts the rotation of the rotor of the electric motor unit toward the target rotational position until the rotor of the electric motor unit reaches the target rotational position.

3. The shift-by-wire system according to claim 1, wherein the determination prohibition unit prohibits the execution of the range determination operation from the time point at which the range shift unit starts the rotation of the rotor of the electric motor unit toward the target rotational position until an end of a predetermined waiting time period, which begins when the rotor of the electric motor unit reaches the target rotational position after the time point of starting the rotation of the rotor of the electric motor unit.

4. The shift-by-wire system according to claim 1, wherein the determination prohibition unit enables the actual range determination unit to execute the range determination operation, when the range determination unit determines that the rotational position of the manual shaft is in the predetermined extent of the target range and after the range determination operation prohibiting period.

5. The shift-by-wire system according to claim 4, wherein the actual range determination unit senses the actual range of the automatic transmission when the range determination unit determines that the rotational position of the manual shaft is in the predetermined extent of the target range.

6. The shift-by-wire system according to claim 1, wherein the range determination unit senses that the shift range of the automatic transmission is at the target range when the rotational position of the manual shaft is in the predetermined extent of the target range, and
    the actual range determination unit senses the shift range, which is sensed with the range determination unit, as the actual range of the automatic transmission.

7. The shift-by-wire system according to claim 1, wherein the actual range determination unit senses the actual range of the automatic transmission only when it is not in a middle of a range shifting operation.

8. The shift-by-wire system according to claim 1, wherein the determination prohibition unit prohibits the actual range determination unit from executing the range determination operation on determination that it is in the range determination operation prohibiting period, and
    the determination prohibition unit enables the actual range determination unit to execute the range determination operation on determination that it is not in the range determination operation prohibiting period.

* * * * *